(No Model.)
J. C. COTTIE & C. J. MARKS.
SPROCKET WHEEL AND CHAIN.
No. 579,742.    Patented Mar. 30, 1897.
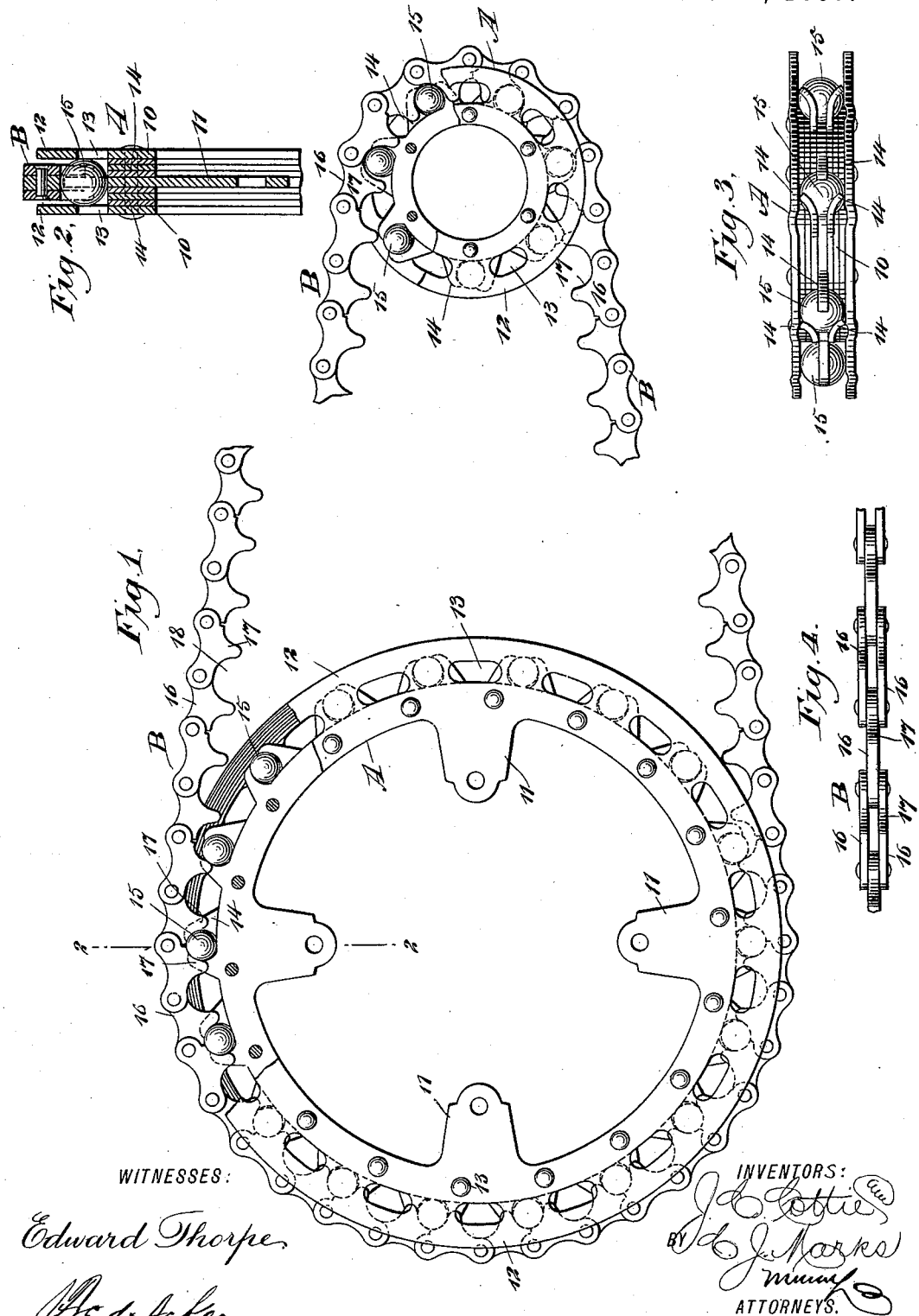
WITNESSES:
Edward Thorpe
Fred Acker
INVENTORS:
J. C. Cottie
C. J. Marks
BY
ATTORNEYS.

UNITED STATES PATENT OFFICE.

JOHN C. COTTIE, OF NEW YORK, AND CHARLES J. MARKS, OF BROOKLYN, NEW YORK.

SPROCKET WHEEL AND CHAIN.

SPECIFICATION forming part of Letters Patent No. 579,742, dated March 30, 1897.

Application filed July 30, 1896. Serial No. 601,018. (No model.)

*To all whom it may concern:*

Be it known that we, JOHN C. COTTIE, of New York city and county, and CHARLES J. MARKS, of Brooklyn, in the county of Kings, State of New York, have invented a new and useful Improvement in Sprocket-Wheels and Chains Therefor, of which the following is a full, clear, and exact description.

Our invention relates to an improvement in sprocket-wheels and chains therefor, particularly adapted for use in connection with bicycles, but which may be employed with equally good results wherever a sprocket chain and wheel are needed, especially for driving purposes.

The object of the invention is to provide a sprocket-wheel with rolling surfaces for engagement with the chain and to so construct the chain that it will accommodate itself to wheels of different circumference to such an extent that the same pulling or driving power will be obtained in each instance and whereby the teeth on the chain will have perfect clearance in entering and releasing a large or a small wheel.

A further object of the invention is to provide a chain which will be light, economic, durable, and compact, and easy to keep clean, and, furthermore, not liable to catch in the clothing or articles of a similar character with which the chain may be brought in contact, and also to provide a wheel having web-flanges between which the roller-surfaces are placed, whereby the wheel will be self-cleaning and the chain when passing over the wheel will be practically flush with the outer edges of the flanges.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of a large and a small wheel and a chain passing over the two, a portion of the large wheel being broken away. Fig. 2 is a section through the large wheel, taken substantially on the line 2 2 of Fig. 1. Fig. 3 is a circumferential view of the small wheel, and Fig. 4 is a bottom plan view of a section of the chain.

In carrying out the invention the wheel A is illustrated as constructed of a series of rings 10, which are bolted or riveted together or secured together in any suitable or approved manner at or near their peripheries. The centermost ring is provided with inwardly-extending lugs 11, whereby the wheel may be attached to a suitable hub, but the lugs 11 may be omitted and any other means employed for connecting the hub with the peripheral portion of the wheel.

A flange 12 is formed at each side of the peripheral portion of the wheel, and these flanges are preferably continuations of the outermost rings 10. The flanges are webbed, being preferably provided with openings 13, as shown in Figs. 1 and 2, to facilitate the escape of dust or any foreign material that would be liable to lodge in the space between the flanges.

Preferably cleats 14, three in number in a group, are formed upon the periphery of the wheel between the flanges thereof, and within each group of cleats a ball 15 is held to revolve. The balls are substitutes for the usual teeth of a sprocket-wheel, and may be held to revolve at the periphery of the wheel in other manner than illustrated.

The chain B consists of a series of links 16, each alternate link being double and the connecting-links single, as shown in Fig. 4. Each link is provided with a tooth 17, formed upon its under face, and the side edges of the teeth are concaved. The teeth 17 are not centrally located on the links, but are placed at one side of the transverse center of said links, so that when the links are pivoted together, as shown at Fig. 1, segmental pockets 18 are formed between the teeth of the links, and adjoining pockets will be of different sizes, one pocket being of predetermined dimensions and the next of small dimensions. The chain is adapted to enter the space on the sprocket-wheel between the flanges, and the balls or rolling surfaces 15 of the wheels are received in the pockets of the chain.

Usually a large and a small sprocket-wheel are connected by a chain, and in this event the larger pockets will receive the balls or rolling surfaces of the smaller wheel, as is clearly shown in Fig. 1.

The advantage in not having the teeth in the center of the links is that the teeth in entering to an engagement with the wheels and in releasing the wheels will have a maximum of clearance without in any manner detracting from the pulling or pushing power of the chain; and, furthermore, by reason of the teeth being removed from the center of the links the chain will accommodate itself much more accurately to wheels of different diameters than if the teeth were differently placed or centrally located.

The device is exceedingly simple, it is durable, and it is economic, and the flanges on the wheels when the chain is in place thereon will effectually prevent a wheel or a chain passing over it from catching in the clothing of the rider of the wheel or entangling with similar material which may be brought in contact with the wheel or with the chain.

The wheel is self-cleaning, since the chain in passing over the wheel will force any dirt or foreign matter out through the openings 13 in the flanges, and it is evident that the chain may be readily kept clean and that friction will be reduced to a minimum.

Having thus described our invention, we claim as new and desire to secure by Letters Patent—

1. A sprocket-wheel constructed of a series of rings secured together, a flange formed at each side of the peripheral portion of the wheel, bearings located in the space between the flanges of the wheel, and rolling surfaces mounted to turn in the said bearings, substantially as shown and described.

2. A sprocket-wheel constructed of a series of rings secured together, the center ring being provided with inwardly-extended lugs, a flange formed at each side of the peripheral portion of the wheel, the said flanges being continuations of the outer rings and provided with openings, and rolling surfaces located between the said flanges, as and for the purpose specified.

3. A sprocket-wheel provided with peripheral flanges, cleats arranged in groups upon the periphery of the wheel between the flanges, and a ball held to revolve within each group of cleats, as and for the purpose set forth.

4. A sprocket-chain the links whereof are provided with teeth, the said teeth having their centers at one side of the center of the links of which they form a part, as and for the purpose specified.

5. A sprocket-chain consisting of a series of links, each alternate link being double and the connecting-links single, each of said links being provided with a tooth formed upon its inner face and having its side edges concaved the said teeth having their centers at one side of the center of the link to which they respectively belong, as and for the purpose specified.

6. The combination with a sprocket-wheel having balls mounted to revolve on its periphery, and flanges extending beyond the periphery of the wheel at its sides, the said balls being located between said flanges, of a chain, the links whereof are provided with teeth at their inner edges, the said teeth having their side edges concaved, and the center of said teeth being at one side of the center of the links to which the teeth belong, as and for the purpose set forth.

7. The combination, with a sprocket-wheel having spherical surfaces mounted to revolve on its periphery, of a chain the links whereof are provided with teeth at their inner edges, the center of the said teeth being at one side of the center of the links to which the teeth belong, whereby alternating pockets of different dimensions are formed, the said pockets being adapted for the reception of the spherical rotating surfaces of the wheel, as and for the purpose set forth.

8. The combination, with a sprocket-wheel having spherical objects mounted to turn upon its periphery, and flanges extending beyond the periphery of the wheel at its sides, between which flanges the said spherical objects are located, the said flanges being provided with openings, of a chain the links whereof are provided with teeth at their inner edges, the center of the said teeth being at one side of the center of the links to which the teeth belong, whereby alternating pockets of different dimensions are formed, the said pockets being adapted for the reception of the spherical rotating surfaces of the wheel, as and for the purpose specified.

9. A sprocket-wheel having bearings formed upon the periphery, and balls mounted to revolve freely in the bearings, the said bearings permitting of the exposure of a major portion of the balls for engagement with the teeth of a sprocket-chain, whereby the balls are freely revolved, as and for the purpose specified.

10. The combination with a sprocket-wheel having bearings formed upon its periphery, and balls mounted to revolve freely in the bearings, of a sprocket-chain consisting of a series of links each provided with a tooth upon its inner face, the said teeth having their centers at one side of the center of the link to which they respectively belong, the major portion of the said balls being exposed for engagement with the teeth of said chain, whereby the said balls revolve freely when the chain is moved, as and for the purpose set forth.

11. A sprocket-wheel provided with cleats arranged in groups upon the periphery of the wheel, and a ball held to revolve within each group of cleats, the said cleats being arranged to permit of the exposure of the major portion of the said balls for engagement with a sprocket-chain, as and for the purpose set forth.

JOHN C. COTTIE.
    CHARLES J. MARKS.

Witnesses to signature of John C. Cottie:
 J. FRED. ACKER,
 F. W. HANAFORD.

Witnesses to signature of Charles J. Marks:
 J. FRED. ACKER,
 A. A. HOPKINS.